US012718309B1

(12) United States Patent
Seif et al.

(10) Patent No.: US 12,718,309 B1
(45) Date of Patent: Aug. 25, 2026

(54) DOCKETING SYSTEM AND METHOD

(71) Applicant: Cardinal Holdings, LLC, Evanston, IL (US)

(72) Inventors: Charbel Seif, Chicago, IL (US); Frank C. Nicholas, Sr., Wilmette, IL (US)

(73) Assignee: CARDINAL HOLDINGS, LLC, Evanston, IL (US)

(*) Notice: Subject to any disclaimer, the term of this patent is extended or adjusted under 35 U.S.C. 154(b) by 69 days.

(21) Appl. No.: 18/789,343

(22) Filed: Jul. 30, 2024

Related U.S. Application Data

(60) Provisional application No. 63/529,961, filed on Jul. 31, 2023.

(51) Int. Cl.
*G06Q 50/18* (2012.01)

(52) U.S. Cl.
CPC .................................. *G06Q 50/184* (2013.01)

(58) Field of Classification Search
CPC .................................................... G06Q 50/184
USPC ......................................................... 705/310
See application file for complete search history.

(56) References Cited

U.S. PATENT DOCUMENTS 8,832,205 B2 9/2014 Nelson et al.
8,914,450 B1 * 12/2014 Buchheit ................ H04L 51/48 726/28
9,378,265 B2 6/2016 McHenry et al.
9,385,980 B2 * 7/2016 Homsany ................ H04L 51/08
10,673,796 B2 6/2020 Mohan et al.
2007/0147680 A1 6/2007 Lundberg
2017/0161372 A1 6/2017 Fernández et al.
2020/0117718 A1 4/2020 Lundberg et al.
2020/0150853 A1 5/2020 Kulkarni et al.
2021/0152504 A1 5/2021 Lundberg et al.
2021/0165797 A1 6/2021 Shek et al.
2021/0192408 A1 6/2021 Lundberg et al.
2022/0043836 A1 2/2022 Upadhyay et al.
2023/0052950 A1 2/2023 Lundberg et al.
2023/0195772 A1 6/2023 Chandak et al.
2024/0419298 A1 * 12/2024 Gandhi ................. G06F 3/0485
2025/0021919 A1 * 1/2025 Belkin ................. G06Q 10/067

OTHER PUBLICATIONS

"Comparative Analysis of Text Vectorization Methods" Published by STIC (Year: 2023).*

(Continued)

*Primary Examiner* — Zeina Elchanti
(74) *Attorney, Agent, or Firm* — Douglas B Teaney; CARDINAL LAW GROUP, LLC

(57) ABSTRACT

A computer-implemented system and method performed by a docketing system. At least one docketing action is assigned to a plurality of emails stored in a database. The text associated with each of the emails is vectorized. Attachment text of the emails merged with the email text. Vectorization ranges are created for the plurality of emails based on the assigned docketing actions. When an email is received at an email box of the docketing system, the text of the received email and the text of its attachment are merged and vectorized. A determination on whether the received email vectorization falls within one or more of the vectorization ranges. The received email is then associated with a docketing action based on the determination.

20 Claims, 3 Drawing Sheets

(56) References Cited

OTHER PUBLICATIONS

BlackHills SureDocket(TM) Automated Docketing, commercial product; https://blackhills.ai/our-services/automated-services/automated-ip-docketing/, accessed Feb. 11, 2025, published at least as early as Jul. 30, 2023.

AltLegal Automated Docketing System, commercial product; https://www.altlegal.com/; accessed Feb. 11, 2025; published at least as early as Jul. 30, 2023.

Clairvolex docketing system, commercial product; https://www.clairvolex.com/products/clair-docket-assist; accessed Feb. 11, 2025; published at least as early as Jul. 30, 2023.

Clarivate automated docketing system, commercial product; https://clarivate.com/intellectual-property/ip-management-software/docket/; accessed Feb. 11, 2025; published at least as early as Jul. 30, 2023.

Anaqua docketing system, commercial product; https://www.anaqua.com/pattsy-wave/; accessed Feb. 11, 2025; published at least as early as Jul. 30, 2023.

MaxVal Symphony “Zero-Touch” Docketing System, commercial product; https://www.maxval.com/symphony-for-patents/docketing/; accessed Feb. 11, 2025; published at least as early as Jul. 30, 2023.

* cited by examiner

FIG. 3

DOCKETING SYSTEM AND METHOD

This application claims priority under 35 U.S.C. § 119(e) (1) of U.S. Ser. No. 63/529,961, filed 31 Jul. 2023, the entire contents of which are hereby expressly incorporated herein by reference.

TECHNICAL FIELD

The present invention relates to the field of docketing systems in the field of intellectual property.

BACKGROUND OF THE INVENTION

Docketing of patents and trademarks presently requires docketing personnel to sort through various emails from foreign agents, law firms, corporate legal counsel, and various foreign and domestic patent offices. Often the docketing requirements differ based on client preferences and various docketing platforms. Sorting and loading email attachments and then loading the attachments into docketing systems and docketing based on the email instructions and attachments is a manual time-consuming task. It would be desirable to have an automated system that would streamline this process.

SUMMARY OF THE INVENTION

The invention provides a computer-implemented method performed by a docketing system; the method includes the following steps. At least one docketing action is assigned to a plurality of emails stored in a database. The text associated with each of the emails is vectorized. Attachment text of the emails merged with the email text. Vectorization ranges are created for the plurality of emails based on the assigned docketing actions. When an email is received at an email box of the docketing system, the text of the received email and the text of its attachment are merged and vectorized. A determination on whether the received email vectorization falls within one or more of the vectorization ranges. The received email is then associated with a docketing action based on the determination.

In an embodiment, the invention comprises a computer-implemented method performed by a docketing system. The method comprises assigning at least one docketing action to each of a plurality of emails stored in a database; vectorizing the text associated with each of the emails; creating vectorization ranges for the plurality of emails based on their assigned docketing actions; receiving an email at an email box of the docketing system; vectorizing the text of the received email; determining whether the received email vectorization falls within one or more of the vectorization ranges; and associating the received email with at least one docketing action based on the determination.

In an embodiment, the invention further comprises the method comprising at least one of the emails including at least one attachment, merging the text of a body of the at least one email with the at least one attachment, and wherein the body and the attachment text are vectorized together.

In an embodiment, the invention further comprises associating a program with each docketing action; and executing the program based on the at least one docketing action associated with the received email.

In an embodiment, the invention further comprises creating an additional vectorization range based at least in part on the received email falling outside of the vectorization ranges; and associating the additional vectorization range with a docketing instruction.

In an embodiment, the invention comprises a computer-implemented method performed by a docketing system, wherein the method comprises receiving a first user with a first set of docketing preferences; receiving a second user with a second set of docketing preferences; associating the first user and second user docketing preferences with docketing actions; assigning at least one docketing action to each of a plurality of emails stored in a database; vectorizing the text for each of the emails; creating vectorization ranges for the plurality of emails based on their assigned docketing actions; receiving an email at an email box of the docketing system; vectorizing the text of the received email; determining whether the vectorization of the text of the received email falls with one or more of the vectorization ranges; determining whether the received email is associated with the first or second set of docketing preferences; and associating the received email with a docketing action and associated docketing preferences based on the vectorization determination and docketing preference determination.

In an embodiment, the method comprises wherein at least one of the emails include at least one attachment, merging the text of a body of the at least one email with the at least one attachment, and wherein the body and the attachment text are vectorized together.

In an embodiment, the method further comprises associating a program with each docketing action; and executing the program based on the at least one docketing action associated with the received email.

In an embodiment, the method further comprises creating an additional vectorization range based at least in part on the received email falling outside of the vectorization ranges; and associating the additional vectorization range with a docketing instruction.

In an embodiment, the invention comprises a computer-implemented method performed by a docketing system. The method comprises assigning at least one docketing action to each of a plurality of emails stored in a database; determining whether the email includes at least one attachment; merging text of the email with text from the at least one attachment based on the attachment determination; vectorizing the text or merged text associated with each of the emails; creating vectorization ranges for the plurality of emails based on their assigned docketing actions; receiving an email at an email box of the docketing system; determining whether the received email includes at least one attachment; merging the received email text with the text of the received email attachment based on the received email attachment determination; vectorizing the text or merged text of the received email; determining whether the received email vectorization falls within one or more of the vectorization ranges; and associating the received email with at least one docketing action based on the determination.

In an embodiment, the method further comprises associating a program with each docketing action; and executing the program based on the at least one docketing action associated with the received email.

In an embodiment, the method further comprises creating an additional vectorization range based at least in part on the received email falling outside of the vectorization ranges; and associating the additional vectorization range with a docketing instruction.

BRIEF DESCRIPTION OF THE DRAWINGS

FIG. 3 provides a flowchart of the docketing process of one embodiment of the invention.

DETAILED DESCRIPTION OF PRESENTLY PREFERRED EMBODIMENTS OF THE INVENTION

Figure 1:
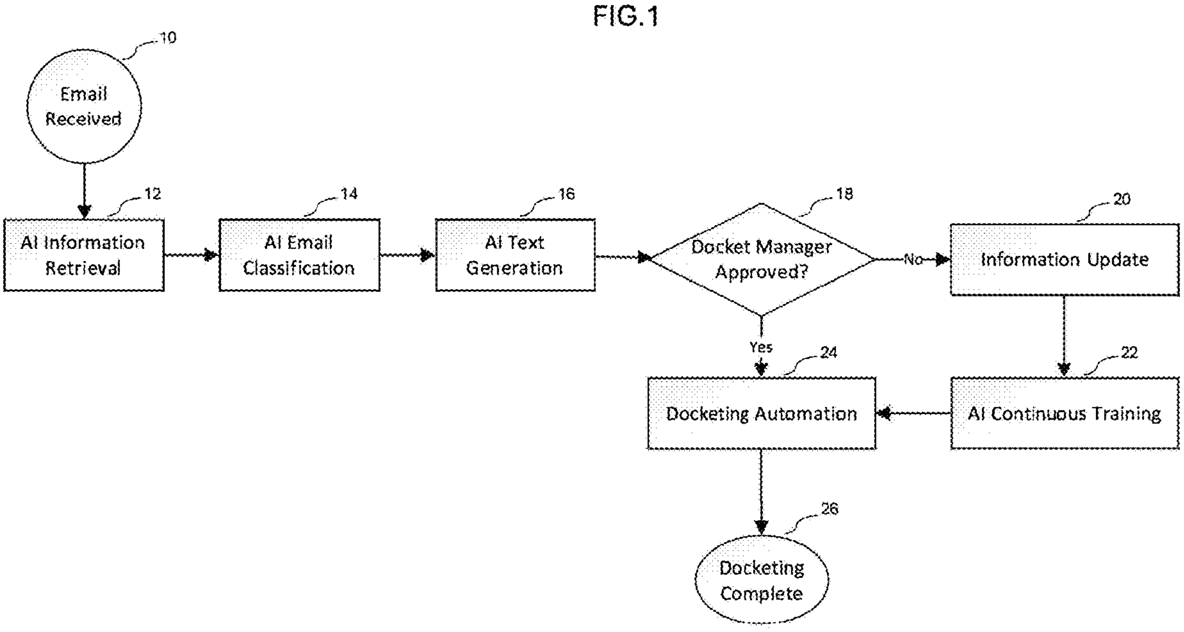
FIG. 1 provides a flowchart of the docketing process of one embodiment of the invention.

While this invention is susceptible of embodiment in many different forms, there are shown in the drawings and described in detail herein, specific embodiments, with the understanding that the present disclosure is to be considered as an exemplification of the principles of the invention, and is not intended to limit the invention to the embodiment(s) illustrated.

The invention and accompanying drawings will now be discussed in reference to the numerals provided therein to enable one skilled in the art to practice the present invention. The drawings and descriptions are exemplary of various aspects of the invention and are not intended to narrow the scope of the appended claims. Unless specifically noted, it is intended that the words and phrases in the specification and the claims be given their plain, ordinary, and accustomed meaning to those of ordinary skill in the applicable arts. It is noted that the inventors can be their own lexicographers. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventor's intent and desire that the simple, plain, and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112(f) or pre-AIA 35 U.S.C. § 112¯6. Thus, the use of the words "function," "means" or "step" in the Detailed Description of the Invention or claims is not intended to somehow indicate a desire to invoke the special provisions of 35 U.S.C. § 112(f) or pre-AIA 35 U.S.C. § 112¯6 to define the invention. To the contrary, if the provisions of 35 U.S.C. § 112(f) or pre-AIA 35 U.S.C. § 112¯6 are sought to be invoked to define the inventions, the claims will specifically and expressly state the exact phrases "means for" or "step for" and the specific function (e.g., "means for roasting"), without also reciting in such phrases any structure, material or act in support of the function. Thus, even when the claims recite a "means for . . . " or "step for . . . " if the claims also recite any structure, material or acts in support of that means or step, or that perform the recited function, then it is the clear intention of the inventor not to invoke the provisions of 35 U.S.C. § 112(f) or pre-AIA 35 U.S.C. § 112¯6. Moreover, even if the provisions of 35 U.S.C. § 112(f) or pre-AIA 35 U.S.C. § 112¯6 are invoked to define the claimed inventions, it is intended that the inventions not be limited only to the specific structure, material or acts that are described in the illustrated embodiments, but in addition, include any and all structures, materials or acts that perform the claimed function as described in alternative embodiments or forms of the invention, or that are well known present or later-developed, equivalent structures, material or acts for performing the claimed function.

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and apparatus are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, apparatus, and technologies to which the disclosed inventions may be applied. Thus, the full scope of the inventions is not limited to the examples that are described below.

Various aspects of the present invention may be described in terms of functional block components and various processing steps. Such functional blocks may be realized by any number of hardware or software components configured to perform the specified functions and achieve the various results.

In one embodiment, the system utilizes web services, automation tools, and machine learning technologies to provide real-time email management capabilities, classification, and automatic docketing. The system enables the retrieval and storage of email metadata and attachments, real-time synchronization of email content with a database, automated email classification using a trained model, and Web automation for docketing.

The proposed system introduces an advanced email monitoring mechanism, offering real-time synchronization, automated information retrieval, automated email classification, automated text generation, and automated docketing. Primarily, a web service is designed to interface with a mailbox server through, for example, Microsoft's Graph API, fetching all necessary email metadata (i.e., "From," "To," "Subject," "Body") and relevant attachments from a specified mailbox.

This metadata and email body content are subsequently stored in a database, for example, SQL Server database for optimal data management and retrieval. Meanwhile, any searchable attachments, such as PDFs or text documents, are stored within a blob storage, for example, Azure Blob storage, providing a scalable, cloud-based storage solution. Non-searchable attachments, like images, diagrams, and videos, may be omitted as they do not facilitate text-based search functions.

To maintain real-time synchronization, the system diligently monitors the mailbox. However, instead of using Microsoft Power Automate, this system opts for a polling-based approach. It implements a custom function that regularly checks for new emails, for example, every 30 seconds, enabling the system to consistently keep the database and file storage synchronized with the mailbox.

Leveraging the Document Extraction cognitive skill from Azure Cognitive Services, the system's ability to retrieve document information is greatly amplified. This feature empowers the system to interpret email metadata, along with opening and viewing the contents of documents. It also has the capability to download hyperlinked documents within the emails and pinpoint essential items that necessitate docketing.

For automated email categorization, a custom text classification model may be used. This model is trained using an AI service, for example, Azure Cognitive Services with the content of pre-classified emails to provide a plurality of ranges associated with the classifications. Once the model is fully trained and ready, a service is implemented that leverages this model to automatically categorize incoming emails with a predicted class or category.

The following stage incorporates, for example, Azure OpenAI for text generation, a step that constructs the required text for docketing. This generation follows specific rules based on each email's classification. Azure OpenAI scrutinizes the validated data, creating contextually appropriate text that fits the docketing system's requirements. The generated text varies depending on the email's classification, ensuring accurate alignment with the original content. This utilization of AI significantly enhances the system's overall accuracy and efficiency, setting the stage for the concluding step of automatic docketing.

Once the Document Extraction cognitive skill gathers and identifies necessary information, and Azure OpenAI generates appropriate text, in one embodiment, a Docket Manager interface is provided to allow validation of the retrieved data and correct any discrepancies and ensure the system has correctly identified docketing items and generated correct information to be docketed. In this embodiment, this human-in-the-loop process safeguards the system's accuracy and reliability, ensuring optimal performance.

The final phase involves automatic docketing, where the processed and verified data is adapted to be compatible with docketing software that supports web automation, for example, RestAPI. This step not only minimizes manual data entry but also ensures error-free and efficient data transmission. Through RestAPI, the system communicates effectively with the docketing software, transferring validated data seamlessly. Alternatively, web automation can replicate human interactions with the software's interface if RestAPI is not available or preferred. This flexibility ensures our system interfaces effectively with various docketing software systems, ensuring an automatic and efficient docketing process.

Phase 1: Realtime Email Monitoring

Phase 2: AI Information Retrieval

Phase 3: AI Email classification

Phase 4: AI Text Generation

Phase 5: Docket Manager Approval and AI Continuous training

Phase 6: Docketing Automation

Real-Time Email Monitoring

Referring to the embodiment of FIG. 1, the system checks for new emails (Block 10) periodically, for example, every thirty seconds. This 30-second interval is chosen because email conversations often see responses approximately every minute. This shorter interval ensures that the system captures new emails in a timely fashion.

In one embodiment, the system employs the Graph API, a robust tool provided by Microsoft. The Graph API offers a unified programmability model that facilitates access to a broad range of data in Microsoft 365, Windows 10, and Enterprise Mobility+Security. It provides REST APIs and client libraries to access various Microsoft 365 services such as mail, calendar, contacts, documents, directory, devices, among others.

The system provides two operational modes for this embodiment of the system:

A trigger-based system using Power Automate: Power Automate is a cloud-based software from Microsoft that allows users to create and automate workflows and tasks across multiple applications and services without the need for developers. In this scenario, Power Automate is configured to trigger a workflow whenever a new email arrives in the mailbox. This reactive system responds to new emails as they are received.

A polling-based system: Here, a custom function is called at regular intervals (in this case, every 30 seconds) to check for new emails. This proactive system is constantly checking for new emails, whether they exist or not.

To implement the polling-based system, a function that employs the Graph API may check the mailbox for new emails. This function may be activated on a regular schedule. Various methods could achieve this, such as, for example, a cron job in a Unix-like operating system or the scheduling capabilities of a cloud service like, for example, Azure Functions.

The polling-based system approach primarily may streamline the development and Continuous Integration/Continuous Deployment (CI/CD) processes and avoid the need to incorporate a new system, in this case, Power Automate.

Implementing a polling-based system with the Graph API directly avoids managing another tool or service. Power Automate, while powerful, introduces an additional layer of complexity. By using a polling-based system with Graph API, complexity is reduced.

Instead of creating Power Automate flows and integrating them into the system, a function that checks for new emails at regular intervals and integrates it directly into an existing application may be used.

The Continuous Integration/Continuous Deployment process may also be simplified with a polling-based approach. Changes to the email-checking function can be made, tested, and deployed as part of routine application updates, utilizing the same processes and tools. In contrast, changes to a Power Automate flow may require a separate testing and deployment process, potentially slowing down the overall development cycle.

Control and Customization: A polling-based system offers full control over the email monitoring process and the function adapts as requirements change.

AI Information Retrieval

The following step (Block12) can, for example, use the Document Extraction cognitive skill provided by Azure Cognitive Services to enhance the system's capacity for retrieving critical information from documents.

Several key functions are executed by the Document Extraction cognitive skill, including:

Read Email: It interprets essential email metadata, such as:

From: Identifying the sender's email address.

To: Recognizing the recipient's email address.

Subject: Decoding the subject line of the email.

Body: Understanding the main content of the email.

Open and Read Attached Documents: This cognitive skill can access, open, and view the contents of documents attached to emails, including various formats like PDFs, Word documents, and others. By viewing these documents, the system delves deeper into the content beyond just the emails, ensuring no crucial information is missed.

Download Hyperlinked Documents: Additionally, the Document Extraction cognitive skill can download hyperlinked documents within emails. As important information is often shared via links to external documents, the ability to access and download these documents allows for a comprehensive examination of all related data.

Identify Matter Items Needed to be Docketed: This cognitive skill can adeptly identify essential items that require docketing. This includes specific information or data points within emails or documents that need to be recorded or tracked.

By fulfilling these functions, the Document Extraction cognitive skill considerably amplifies the system's capabilities, optimizing its efficiency and effectiveness in managing and processing emails and documents.

AI Email Classification

AI Email Classification (Block 14) ensures that documents are categorized for quick retrieval and action using, for example, Azure Custom Text Classification for IP docketing through a two-step process: training and classifications.

The training process involves collecting and categorizing emails, converting attachments to text using OCR, vectorizing the text data, and training the model.

Data Preparation and Upload

Define Classes and Collect Data

Relevant categories for IP docketing are defined. Common categories might include "Patent Filing", "Trademark Application", "Office Action", "Client Communication", and "Invoice". A comprehensive dataset of emails for each category is created, with, for example, at least 1000 samples per classification to ensure the model is trained effectively.

Upload Data to Blob Storage

The emails are organized in a structured format (JSON), where each entry includes the email content (Subject+Body+Attachments) and its corresponding category. Using for example, Azure Storage Explorer or the Azure portal, upload this dataset is uploaded to an Azure Blob Storage container. Maintaining a clear folder structure helps in managing and retrieving data easily.

JSON Format Example

The emails are structured in a JSON format that includes key fields such as "subject", and "body". If there are attachments, they are OCR'd (Optical Character Recognition) and included in the JSON. Below is an example of the JSON structure:

```
{
    "subject": "Patent Filing: Application Number 123456"
    "body": "Dear team, please find attached the documents for the patent filing.",
    "attachments": [
    {
    "filename": "file1.pdf",
    "content": "Extracted text from file1.pdf using OCR."
    },
    {
    "filename": "file2.pdf",
    "content": "Extracted text from file2.pdf using OCR."
    }
  ]
},
```

Text vectorization is a critical step in preparing textual data for machine learning models. It involves converting text into numerical representations that can be processed by algorithms. Tokenization, Stemming, and Lemmatization may be used in this process. Stop words, which are common words that do not add significant meaning, can be removed from the text. Feature extraction may be accomplished using Bag of Words (BoW), TF-IDF (Term Frequency-Inverse Document Frequency), and Word Embeddings.

The vectorized data is input into the training algorithm. In one embodiment, for example, Azure Custom Text Classification uses advanced algorithms such as:

Naïve Bayes: A probabilistic classifier based on Bayes' theorem.

Support Vector Machines (SVM): An algorithm that finds the hyperplane that best separates the classes in the feature space.

Deep Learning Models: Including Recurrent Neural Networks (RNNs) and Transformers (e.g., BERT) for capturing complex patterns in text data.

During training, the model learns from the labeled data by adjusting its parameters to minimize classification errors. This involves iterative processes like backpropagation and optimization techniques such as gradient descent.

Once trained, the deployment phase makes the model available for real-time email classification. In one embodiment, the Azure Custom Text Classification API is used to deploy the model and manage it through Azure's portal.

Once the model is trained and validated, it is deployed using the Azure Custom Text Classification API. The deployment is created using the Document Intelligence Studio to initiate a deployment job. The trained model is selected and deployed to an endpoint accessible for real-time classification tasks. The deployed model is managed through the Azure portal, allowing performance monitoring, versioning, and scaling as needed.

Once the model is deployed, new incoming emails can be classified in real-time by integrating the API endpoint with the IP docketing system. This allows the system to classify new emails based on the model's predictions. The workflow is automated based on classification results, such as automatically routing emails categorized as "Patent Filing" to the patent department or setting up automated reminders for emails classified as "Office Action" to ensure timely responses.

In one embodiment, the email server (e.g., Microsoft Exchange, Gmail) is configured to forward incoming emails to the classification system. The email content and attachments are extracted and prepared for classification. The email content is split into tokens (words or phrases), and words are reduced to their root forms through stemming and lemmatization. Common words that do not add significant meaning are removed. The preprocessed text is converted into numerical vectors using TF-IDF or word embeddings like Word2Vec or BERT. The vectorized data is then used to classify emails. Emails that do not fit within a predefined classification range are manually classified and used to retrain the system.

AI Text Generation

The ensuing stage of this process (Block 16), in one embodiment, uses generative AI, for example, Azure OpenAI, specifically for the purpose of text generation. This step holds significant importance as it is here that the necessary textual content for docketing is created. However, the generation is not arbitrary; it operates under a set of specific rules that depend on the classification of each email.

Azure OpenAI, with its sophisticated artificial intelligence capabilities, examines the validated data and generates text that is not only contextually relevant but also formatted in a way that aligns with the docketing system's requirements. It is important to note that the text generation rules, and output vary depending on the email's classification. For instance, the text generated for an email classified as 'invoice' will differ from one classified as 'official correspondence'. These classification-specific rules ensure that the docketing text aligns with the content and context of the original emails, thereby maintaining accuracy and coherence throughout the process.

By incorporating Azure OpenAI in this manner, the system ensures that the automatically generated text is not only accurate and relevant but also tailored to each specific email classification. This application of AI helps improve the system's overall efficiency and precision, paving the way for the final step of automatic docketing.

Docket Manager Approval and AI Continuous Training

Following the information retrieval and text generation steps, the task moves to a Docket Manager (Block 18). This role is crucial in the workflow as they rigorously scrutinize and validate the gathered data for accuracy and completeness. They ensure the system has accurately identified all necessary docketing items and that the generated text aligns with the requirements for the Docket automation phase.

During this validation stage, the Docket Manager resolves any errors (Block 20) or inconsistencies that may have arisen during the automated retrieval and identification phases. Such discrepancies may include misinterpretations of email metadata, incorrect document classifications, or overlooked docketing items in the system's output.

Incorporating a human element into this critical step is key to maintaining the system's integrity. It provides a safeguard for identifying and correcting any missteps overlooked by the automated processes. Despite the advanced capabilities of the Document Extraction cognitive skill, human oversight enhances the system's efficiency, bolsters its reliability, and ensures that all identified docketing items are indeed accurate and complete.

If any manual corrections are made, they trigger an AI continuous training process (Block 22) that teaches the model how to handle similar situations in future emails. Once the system reaches an acceptable level of accuracy, this step can be minimized or even skipped, reducing, or eliminating the need for human intervention.

Docket Automation

The final stage in this process centers around automatic docketing (Block 24), an integral part of maintaining an organized and efficient workflow. This stage leverages the processed and validated information and transfers it into a form that is compatible with any docketing software that supports API or web automation.

Automatic docketing significantly reduces manual data entry, which in turn minimizes human error and enhances productivity. For compatibility with docketing software, our system converts the validated data into a format that is digestible by the docketing software. This conversion is carried out following the principles of the API, a standard set of rules that allows different software systems to communicate with each other.

API (Application Programming Interface) is a protocol used for exchanging data over a distributed environment. In the context of our system, it will enable the seamless transfer of data from our system to the docketing software. This interoperability is vital as it ensures that the correct, validated data ends up in the right place in the docketing system.

If API is not available or not the preferred method, web automation techniques can be employed as an alternative. Web automation mimics human actions to interact with the docketing software's web interface. For instance, it could simulate mouse clicks or form submissions to enter data into the software.

This adaptability of the system to work with API or web automation makes it flexible and versatile, allowing it to interface with a broad range of docketing software systems, thereby ensuring seamless, automatic docketing (Block 26).

In one embodiment, in operation, the system may be selectable from a SAAS platform. In this embodiment a client interface may prompt user to input preferences related to various docketing instructions. For example, for a first office action, the interface would request a decision on whether an email should be sent, and to which email addresses, whether a text message should be sent and to which numbers. Sending date information may also be requested. For law firm clients or corporations with divisions, for example, billing preferences may be input related to various clients and divisions. Also, renewal fee related preferences related to billing and notification by client or division may be input. In addition, the client may input all related email boxes which receive patent and trademark related information from patent agents, foreign agents, and clients.

Figure 2:
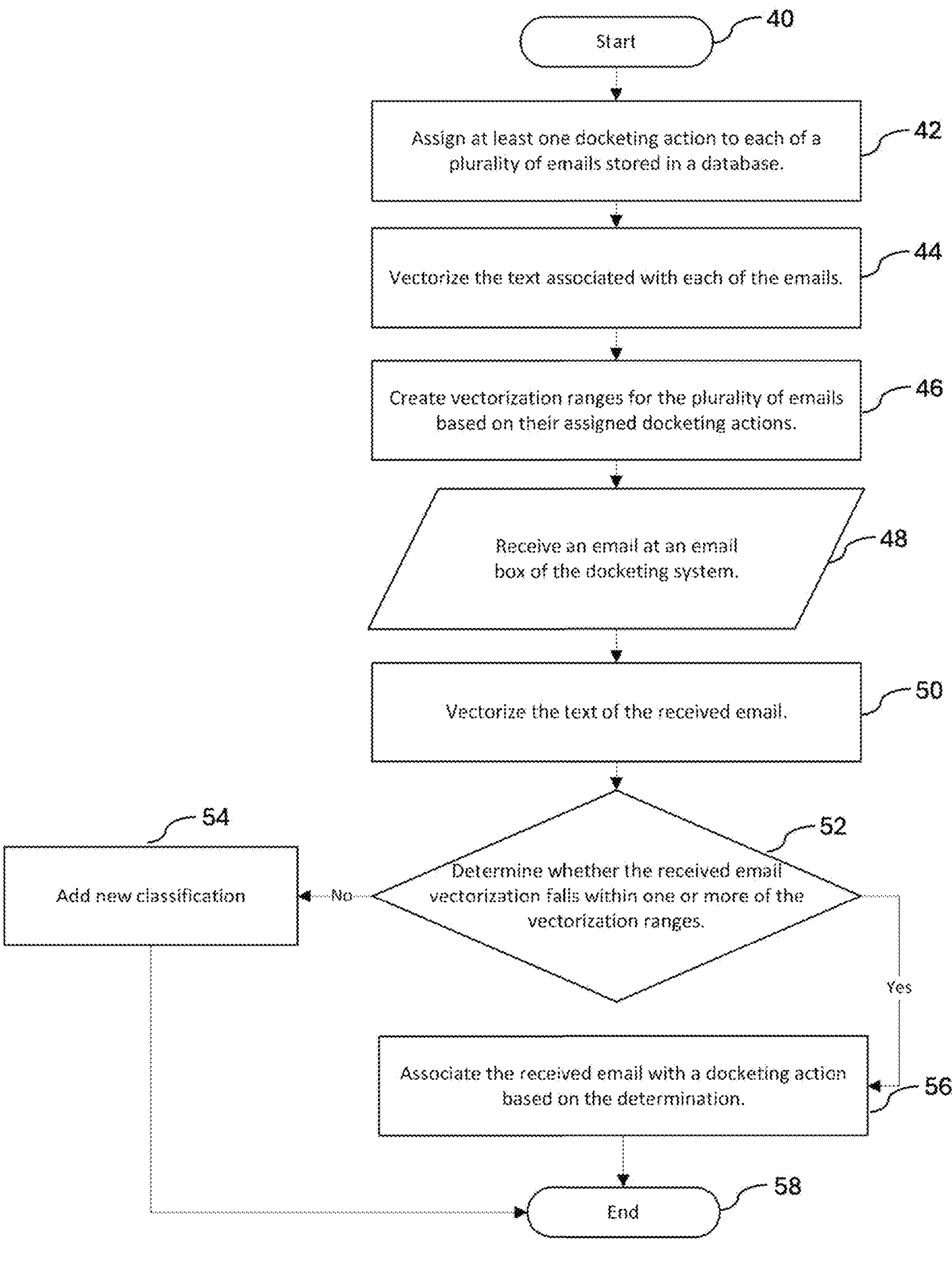
FIG. 2 provides a flowchart of the docketing process of one embodiment of the invention.

Referring to the embodiment of FIG. 2, a user interface allows a user or docket manager to input a classification for each email received in the system (Block 42). The various classifications may be predetermined based on common trademark and patent docketing instructions or may be determined during the email review. For example, classification for a first office action may have a classification of "first" which the docket manager assigns to the email. In one embodiment the system would monitor the selected email box and provide the email for classification which once classified would be stored in an email database. The email database may also have links to a blob storage to hold larger volume data or attachment data.

An artificial intelligence system may be applied to the classified database to vectorize each of the emails including all text in the email and any attachments or links (Block 44). Vectorized ranges are created for each classification to form the classification model (Block 46). When the monitoring system detects any email in the associated email box of the system (Block 48), the text of the received email is vectorized (Block 50). The model is applied to determine if the vectorized text of the received email fall within one of the classification ranges (Block 52). If it is determined that the vectorization of the received email falls within one or more of the vectorization emails, the email is associated with the determined one or more classifications (Block 54). If the received email vectorization does not fall with any classification vectorization ranges, the email may be sent to a user or docket manager to take appropriate action, which may include creating a new classification (Block 56).

In one embodiment, the received email may be provided to a designated user or docket manger to take the appropriate docketing action based on the classification in any of various docketing platforms, for example, CPA, CPI or IPPC systems. In an alternative embodiment once a classification determination is made an automated text may be generated using a generative AI model to provide a client response email and/or notes for a docketing matter within a docketing platform system. In one embodiment, the classified email may be provided into a shadow docket for a given docketing platform system which would autodocket the matter once approval input is received in the shadow docket. Alternatively, for all or some of the classified emails the system through an interface with a docketing platform system autodocket the action based on the classification or classifications. In addition, emails created and notes created by the generative AI model may be auto-sent or alternatively provide in a holding system until user or docketing manager approval input is received and/or allow for editing of the email or note.

When the model determines that an email and its attachments or links do not fall within one of the classification ranges, the system may provide a notification to allow the user or docket manager to input a new classification or classifications. The AI model may be retrained to create a new vectorized range for the new classifications.

If a client desires to switch docketing platform systems, for example between CPI and CPA, the system may provide an interface to allow for auto docketing or shadow docketing for the selected system. Each known platform system interface may be provided for an efficient switch.

Figure 3:
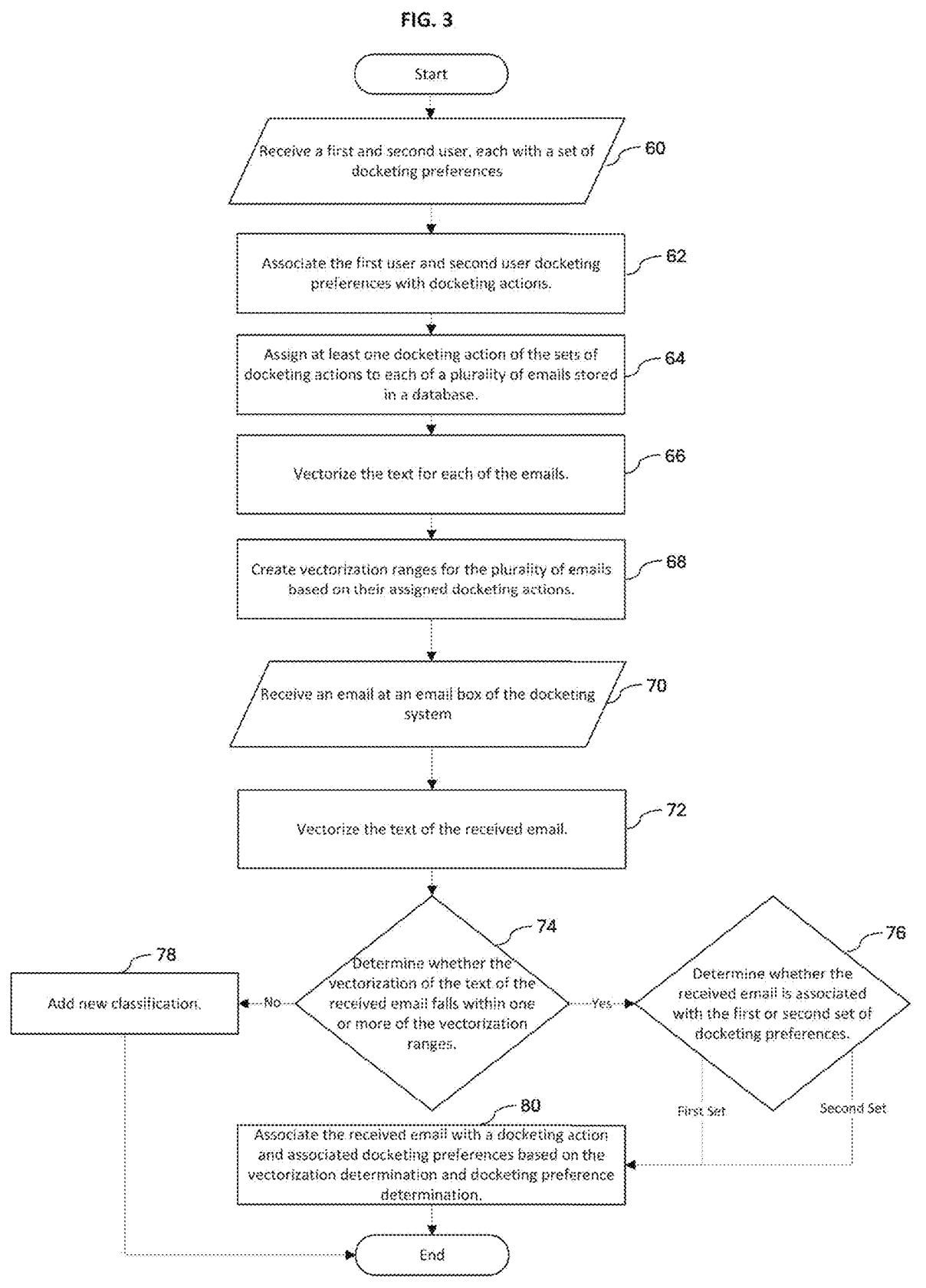

Referring to the embodiment of FIG. 3, users of the system are each associated in a database with their docketing preferences. The system provides an interface to receive input from the user docketing preferences for various docketing actions (Blocks 60, 62). The automated docketing system provides flexibility within a tenant to provide customized instructions. For example, within a law firm a managing attorney would be associated with each law firm client. The system may receive input from a first managing attorney to only send automated emails to specific clients and only for specific matters or input that allows automated docketing for certain clients or matters, shadow docketing for certain types of matters, and hold for review client emails for certain types of matters. These instructions for the first managing attorney are associated with the docketing actions. A second managing attorney may have a completely different set of instructions or docketing preferences.

For example, a first user set of docketing preferences and a second users set of preferences are received in a database with a plurality of docketing actions (Blocks 60). Associating the first user and second user docketing preferences with docketing actions (Block 62). At least one docketing action is assigned to the plurality of emails in a database (Block 64). The emails in the database are vectorized (Block 66). When emails have attachments the text of email along with the text of the attachment are merged. The email text or merged text is vectorized (Block 66) and vectorization ranges are created for the plurality of emails based on the assigned docketing actions (Block 68).

When a new mail is received in the, for example, a law firm email box (Block 70), the text of the email is merged with any attachment text. The email text or merged text of the received email is vectorized (Block 72). The system would determine whether the vectorization of the text of the received email falls within one or more of the vectorization ranges (Block 74). If the vectorized text of received email does not fall within one of the vectorization ranges it is sent to be a user or docket manager to assign a docketing action (Block 78). If the vectorized received email falls within a vectorization range, a determination is also made to determine whether the first or second user preferences are associated with the received email (Block 76). This may be accomplished by AI analysis of the vectorized email text and/or the identification of any of a number of data including, for example, patent application data or client number matter number or managing attorney or client name data in the email and/or attachment. The received email is associated with a docketing action and respective user preferences based on the docketing action determination and the first or second user preference determination (Block 80).

Although the invention has been described with reference to the above examples, it will be understood that many modifications and variations are contemplated within the true spirit and scope of the embodiments of the invention as disclosed herein. Many modifications and other embodiments of the invention set forth herein will come to mind to one skilled in the art to which the invention pertains having the benefit of the teachings presented in the foregoing descriptions and the associated drawings. Therefore, it is to be understood that the invention shall not be limited to the specific embodiments disclosed and that modifications and other embodiments are intended and contemplated to be included within the scope of the appended claims. Although specific terms are employed herein, they are used in a generic and descriptive sense only and not for purposes of limitation.

The invention claimed is:

1. A computer-implemented method performed by a docketing system for docketing intellectual property-related correspondence, the method comprising:

assigning at least one docketing action to each of a plurality of emails stored in a database, wherein each docketing action corresponds to a specific workflow action within the docketing system;

vectorizing the text associated with each of the emails to generate a numerical vector representation of each email in a multi-dimensional vector space using a trained machine learning model;

creating vectorization ranges in the multi-dimensional vector space for the plurality of emails based on their assigned docketing actions, wherein each vectorization range corresponds to a region in the multi-dimensional vector space associated with a particular docketing action;

receiving an email at an email box of the docketing system;

vectorizing the text of the received email using the trained machine learning model to generate a numerical vector representation of the received email;

determining whether the numerical vector representation of the received email-falls within one or more of the vectorization ranges; and associating the received email with at least one docketing action based on the determination.

2. The computer-implemented method of claim 1 wherein at least one of the emails include at least one attachment, merging the text of a body of the at least one email with text extracted from the at least one attachment, and wherein the merged body and attachment text are vectorized together to generate a numerical vector representation.

3. The computer-implemented method of claim 1, further comprising: associating a program with each docketing action; and executing the program based on the at least one docketing action associated with the received email.

4. The computer-implemented method of claim 1, further comprising:

creating an additional vectorization range based at least in part on the received email falling outside of the vectorization ranges; and associating the additional vectorization range with a docketing instruction.

5. The computer-implemented method of claim 1, further comprising: training the machine learning model using a corpus of previously docketed emails having assigned docketing actions, wherein the training generates the vectorization ranges based on the vectorized text of the previously docketed emails.

6. The computer-implemented method of claim 1, further comprising: retraining the machine learning model based on at least one of: (i) the received email falling outside of the vectorization ranges; or (ii) a user-confirmed docketing action for the received email, thereby updating the vectorization ranges.

7. The computer-implemented method of claim 1, wherein the trained machine learning model comprises a natural language processing model configured to generate semantic vector embeddings of the text.

8. The computer-implemented method of claim 1, further comprising: retrieving the received email from an email server via an application programming interface (API), wherein the API retrieves at least one of: sender address, recipient address, subject line, email body, and attachments associated with the received email.

9. The computer-implemented method of claim 1, further comprising: storing at least one of: the email body, email metadata, and vectorized text of each of the plurality of emails in a database; and storing at least one attachment in a storage system separate from the database.

10. The computer-implemented method of claim 1, further comprising: determining a confidence score for the association of the received email with the at least one docketing action based on a position of the numerical vector representation of the received email within the vectorization range; and routing the received email for human review when the confidence score falls below a predetermined threshold.

11. The computer-implemented method of claim 3, wherein executing the program comprises transmitting the docketing action data to a docketing software application via at least one of: a REST API, a web automation interface, or a direct database integration, to automatically populate docketing fields within the docketing software application.

12. The computer-implemented method of claim 1, further comprising: generating a notification to a user associated with the at least one docketing action confirming that the received email has been associated with the at least one docketing action and any resulting docketing program has been executed.

13. The computer-implemented method of claim 1, wherein the received email is associated with a plurality of docketing actions when the numerical vector representation of the received email falls within a plurality of vectorization ranges, and wherein the method further comprises executing each of the plurality of docketing actions.

14. A computer-implemented method of performed by a docketing system for docketing intellectual property-related correspondence for multiple users, the method comprising:

receiving a first user with a first set of docketing preferences;

receiving a second user with a second set of docketing preferences;

associating the first user and second user docketing preferences with docketing actions, wherein each docketing preference set defines user-specific routing and processing rules within the docketing system;

assigning at least one docketing action to each of a plurality of emails stored in a database;

vectorizing the text for each of the emails to generate a numerical vector representation of each email in a multi-dimensional vector space using a trained machine learning model;

creating vectorization ranges in the multi-dimensional vector space for the plurality of emails based on their assigned docketing actions;

receiving an email at an email box of the docketing system;

vectorizing the text of the received email using the trained machine learning model to generate a numerical vector representation of the received email;

determining whether the numerical vector representation of the text of the received email falls within one or more of the vectorization ranges;

determining whether the received email is associated with the first or second set of docketing preferences; and associating the received email with a docketing action and associated docketing preferences based on the vectorization determination and docketing preference determination.

15. The computer-implemented method of claim 14 wherein at least one of the emails include at least one attachment, merging the text of a body of the at least one email with text extracted from the at least one attachment, and wherein the merged body and attachment text are vectorized together to generate a numerical vector representation.

16. The computer-implemented method of claim 14, further comprising:

associating a program with each docketing action; and executing the program based on the at least one docketing action associated with the received email.

17. The computer-implemented method of claim 14, further comprising:

creating an additional vectorization range based at least in part on the received email falling outside of the vectorization ranges; and associating the additional vectorization range with a docketing instruction.

18. A computer-implemented method performed by a docketing system for docketing intellectual property-related correspondence, the method comprising:

assigning at least one docketing action to each of a plurality of emails stored in a database;

determining whether each email includes at least one attachment;

merging text of the email with text from the at least one attachment based on the attachment determination;

vectorizing the text or merged text associated with each of the emails to generate a numerical vector representation of each email in a multi-dimensional vector space using a trained machine learning model;

creating vectorization ranges in the multi-dimensional vector space for the plurality of emails based on their assigned docketing actions;

receiving an email at an email box of the docketing system;

determining whether the received email includes at least one attachment;

merging the received email text with the text of the received email attachment based on the received email attachment determination;

vectorizing the text or merged text of the received email;

determining whether the numerical vector representation of the received email falls within one or more of the vectorization ranges; and associating the received email with at least one docketing action based on the determination.

19. The computer-implemented method of claim 18, further comprising: associating a program with each docketing action; and executing the program based on the at least one docketing action associated with the received email.

20. The computer-implemented method of claim 18, further comprising:

creating an additional vectorization range based at least in part on the received email falling outside of the vectorization ranges; and associating the additional vectorization range with a docketing instruction.

* * * * *